(12) United States Patent
Mann

(10) Patent No.: US 8,118,315 B2
(45) Date of Patent: Feb. 21, 2012

(54) TRAILER WITH HYDRAULIC BED TILT CONTROL

(76) Inventor: Fred W. Mann, Waterville, KS (US)

( * ) Notice: Subject to any disclaimer, the term of this patent is extended or adjusted under 35 U.S.C. 154(b) by 242 days.

(21) Appl. No.: 12/492,990

(22) Filed: Jun. 26, 2009

(65) Prior Publication Data

US 2009/0324375 A1 Dec. 31, 2009

Related U.S. Application Data

(60) Provisional application No. 61/076,115, filed on Jun. 26, 2008.

(51) Int. Cl.
*B60S 9/02* (2006.01)
*B60P 1/16* (2006.01)

(52) U.S. Cl. ............ 280/6.151; 414/482; 414/483; 414/484; 280/425.2

(58) Field of Classification Search ............ 280/6.15, 280/6.151, 47.21, 86, 86.5, 676, 677, 678, 280/682, 124.157, 425.2; 414/480, 482, 414/483, 484
See application file for complete search history.

(56) References Cited

U.S. PATENT DOCUMENTS

| | | | |
|---|---|---|---|
| 1,434,168 A | 10/1922 | Thornton | |
| 1,636,295 A | 7/1927 | Dempsey | |
| 2,288,246 A | 6/1942 | Kuester | |
| 2,487,325 A | 11/1949 | Foster | |
| 2,542,643 A | 2/1951 | Duncan | |
| 2,552,713 A | 5/1951 | Flower | |
| 2,662,655 A | 12/1953 | Sellers | |
| 2,696,928 A | 12/1954 | Faircloth et al. | |
| 2,717,707 A | 9/1955 | Martin | |
| 2,756,882 A | 7/1956 | Albertson | |
| 2,789,714 A | 4/1957 | Norris | |
| 2,803,362 A | 8/1957 | Saenz | |
| 2,900,094 A | 8/1959 | Ferguson | |
| 2,990,966 A * | 7/1961 | Schramm | 414/476 |
| 3,061,124 A | 10/1962 | Schueller | |
| 3,064,842 A | 11/1962 | Haynie | |
| 3,071,267 A | 1/1963 | Bunch | |
| 3,159,294 A | 12/1964 | Forsythe, Jr. | |
| 3,214,047 A | 10/1965 | Moye | |
| 3,241,855 A | 3/1966 | Kersey et al. | |
| 3,335,887 A | 8/1967 | Snook | |
| 3,374,268 A | 3/1968 | Groves | |
| 3,429,585 A * | 2/1969 | Ross | 280/441.2 |
| 3,433,503 A | 3/1969 | Davis | |
| 3,471,047 A | 10/1969 | Burke | |
| 3,472,406 A | 10/1969 | Slipp | |
| 3,550,801 A | 12/1970 | Larson et al. | |
| 3,606,059 A | 9/1971 | Haberle | |

(Continued)

FOREIGN PATENT DOCUMENTS

DE 3629842 3/1988

(Continued)

*Primary Examiner* — Joseph Rocca
(74) *Attorney, Agent, or Firm* — Law Office of Mark Brown, LLC; Mark E. Brown

(57) ABSTRACT

A trailer with a tilting bed includes an hydraulic tilt control. The tilt control includes piston-and-cylinder units for restraining or cushioning the pivotal movement of the bed between a transport mode and a tilt mode. A flow control valve provides fine control of the rotation of the bed when equipment is placed thereon and the trailer converts to a transport mode with the bed level.

17 Claims, 8 Drawing Sheets

U.S. PATENT DOCUMENTS

| | | | |
|---|---|---|---|
| 3,624,786 A | 11/1971 | Lundahl | |
| 3,659,876 A | 5/1972 | Melton | |
| 3,690,490 A | 9/1972 | Hall | |
| 3,780,894 A | 12/1973 | Holmes et al. | |
| 3,795,333 A | 3/1974 | Tebben | |
| 3,799,373 A | 3/1974 | Randall | |
| 3,834,565 A | 9/1974 | Goodman et al. | |
| 3,927,775 A | 12/1975 | Graupmann | |
| 3,929,353 A | 12/1975 | Burleson et al. | |
| 3,968,892 A | 7/1976 | Spars | |
| 4,046,274 A | 9/1977 | Libersky | |
| 4,088,235 A | 5/1978 | Thacker | |
| 4,101,081 A | 7/1978 | Ritter et al. | |
| 4,133,440 A | 1/1979 | Heidrick, Jr. | |
| 4,144,979 A | 3/1979 | Leach et al. | |
| 4,176,853 A | 12/1979 | Brock | |
| 4,222,698 A | 9/1980 | Baelter | |
| 4,231,710 A | 11/1980 | Landoll | |
| 4,243,353 A | 1/1981 | Reed | |
| 4,266,797 A | 5/1981 | Rhodes | |
| 4,283,073 A | 8/1981 | Gostomshi et al. | |
| 4,305,694 A | 12/1981 | Chan | |
| 4,318,657 A | 3/1982 | Znidaric | |
| 4,320,907 A | 3/1982 | Eaton | |
| 4,372,572 A * | 2/1983 | Verschage | 280/441.2 |
| 4,380,415 A | 4/1983 | Higgins et al. | |
| 4,475,761 A | 10/1984 | Milroy et al. | |
| 4,516,902 A | 5/1985 | Matson | |
| 4,630,991 A | 12/1986 | Landoll et al. | |
| 4,647,270 A | 3/1987 | Maloney | |
| 4,657,233 A | 4/1987 | Vroom | |
| 4,729,712 A | 3/1988 | Corley, Jr. | |
| 4,730,974 A | 3/1988 | Andre | |
| 4,792,274 A | 12/1988 | Cockram | |
| 4,806,061 A | 2/1989 | Fenton | |
| 4,813,841 A | 3/1989 | Eischen | |
| 4,842,470 A | 6/1989 | Hubbard | |
| 4,850,788 A | 7/1989 | Dickson | |
| 4,865,341 A | 9/1989 | Hicks | |
| 4,943,202 A | 7/1990 | Galloway | |
| 4,979,867 A | 12/1990 | Best | |
| 4,986,719 A | 1/1991 | Galbreath | |
| 5,011,362 A | 4/1991 | Pijanowski | |
| 5,033,931 A | 7/1991 | Mann | |
| 5,051,053 A | 9/1991 | Groeneweg | |
| 5,092,623 A | 3/1992 | Swanner | |
| 5,094,583 A | 3/1992 | Bills et al. | |
| 5,137,414 A | 8/1992 | Sloan et al. | |
| 5,145,310 A | 9/1992 | Calzone | |
| 5,211,413 A | 5/1993 | Williams, Sr. et al. | |
| 5,216,942 A | 6/1993 | Sendoykas | |
| 5,234,308 A | 8/1993 | Mann | |
| 5,259,720 A | 11/1993 | Lobner | |
| 5,263,735 A | 11/1993 | Mann | |
| 5,263,807 A | 11/1993 | Pijanowski | |
| 5,306,113 A | 4/1994 | Mann | |
| 5,324,160 A | 6/1994 | Smith | |
| 5,340,267 A | 8/1994 | Stoll et al. | |
| 5,775,868 A | 7/1998 | Mann | |
| 5,782,514 A | 7/1998 | Mann | |
| 5,816,767 A | 10/1998 | Mann | |
| 5,967,733 A * | 10/1999 | Cash | 414/483 |
| 6,135,700 A * | 10/2000 | Collins | 414/476 |
| 7,618,227 B2 * | 11/2009 | Smith | 414/484 |

FOREIGN PATENT DOCUMENTS

| | | |
|---|---|---|
| DE | 4240371 | 6/1994 |
| GB | 183345 | 7/1922 |
| JP | 63207745 | 8/1988 |
| NL | 8701608 | 2/1989 |
| NL | 8801783 | 2/1990 |
| SU | 954260 | 8/1982 |

* cited by examiner

TRANSPORT MODE

TILT MODE

EXTEND CYLS. & LEVEL BED

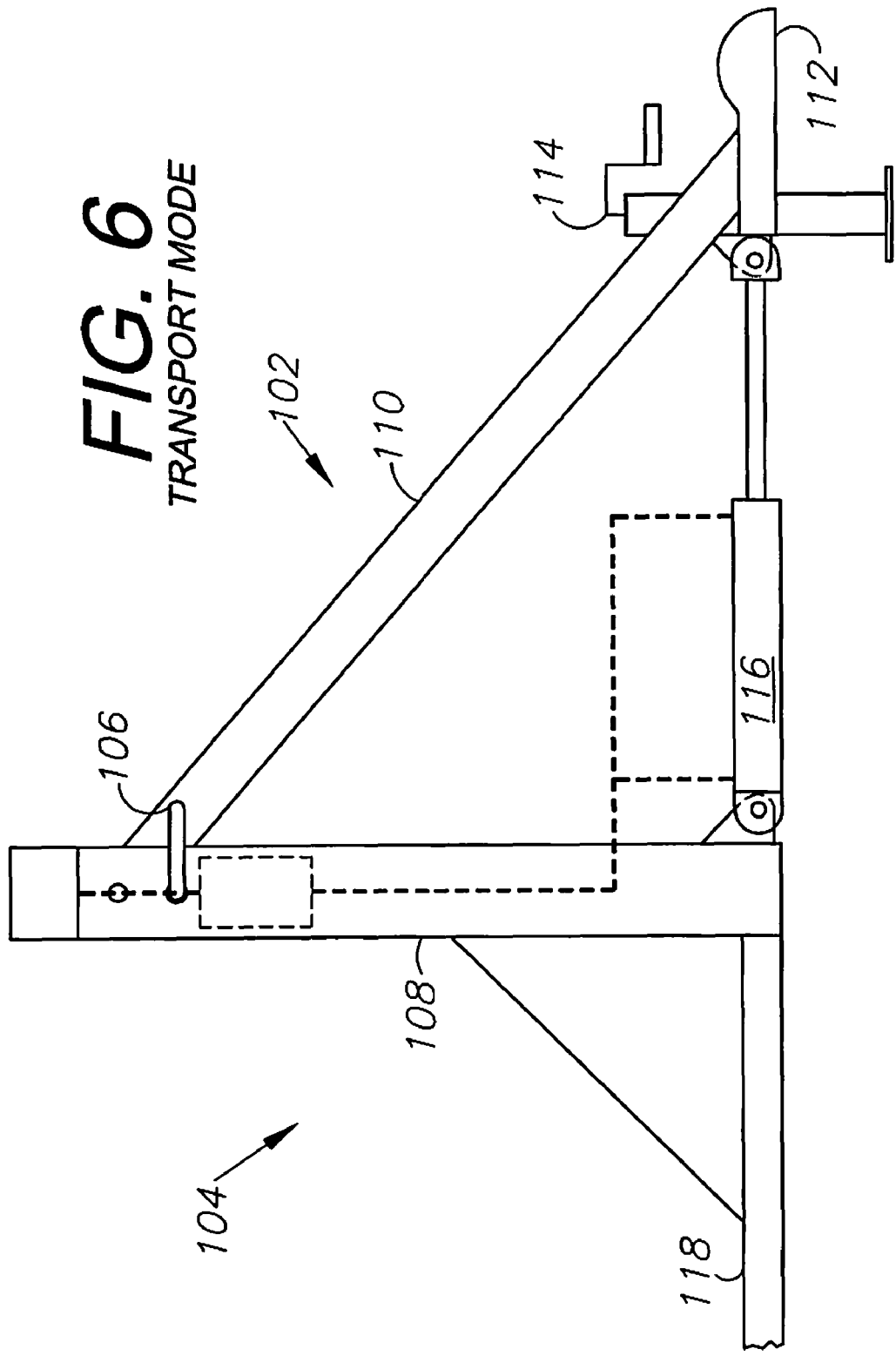

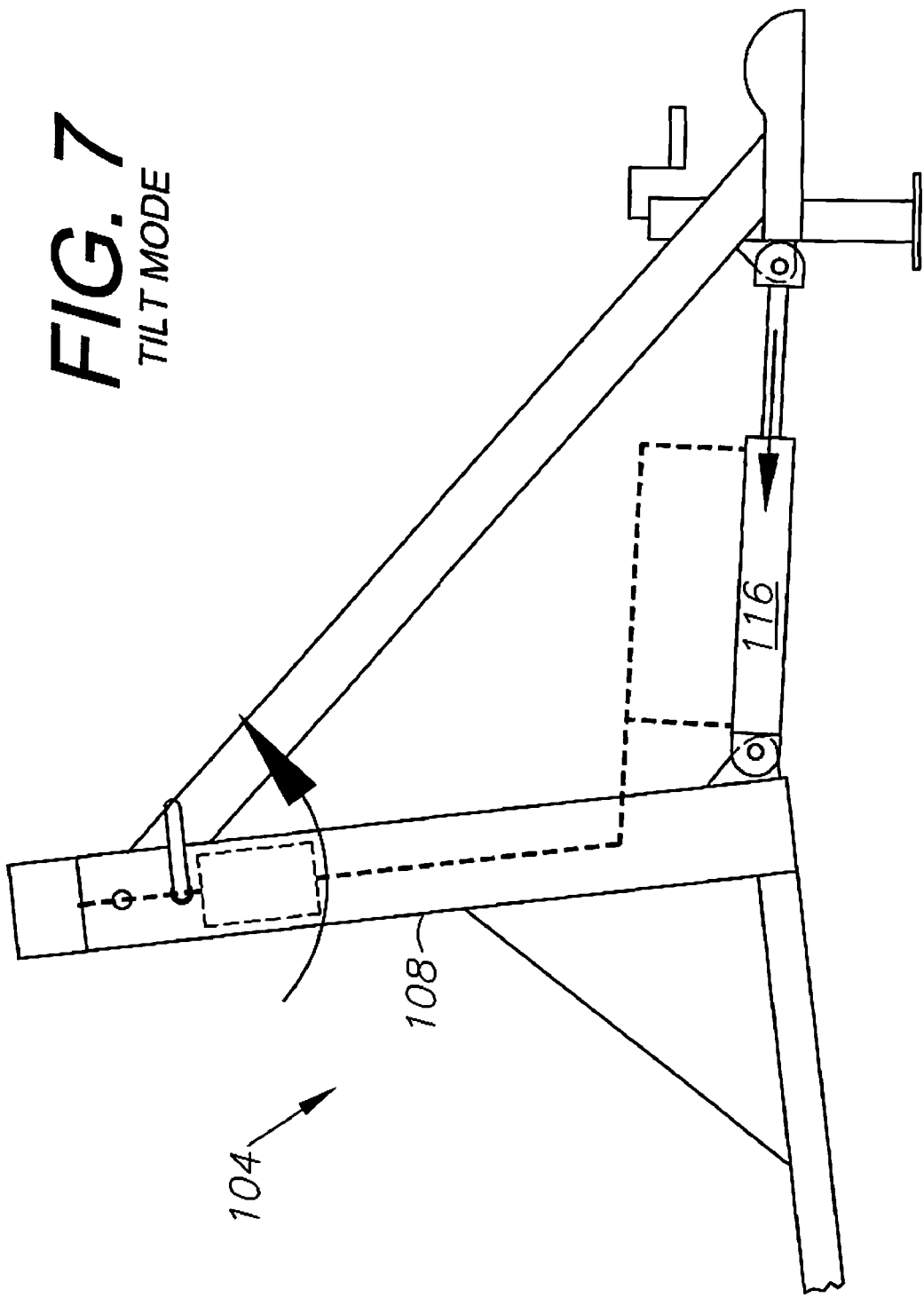

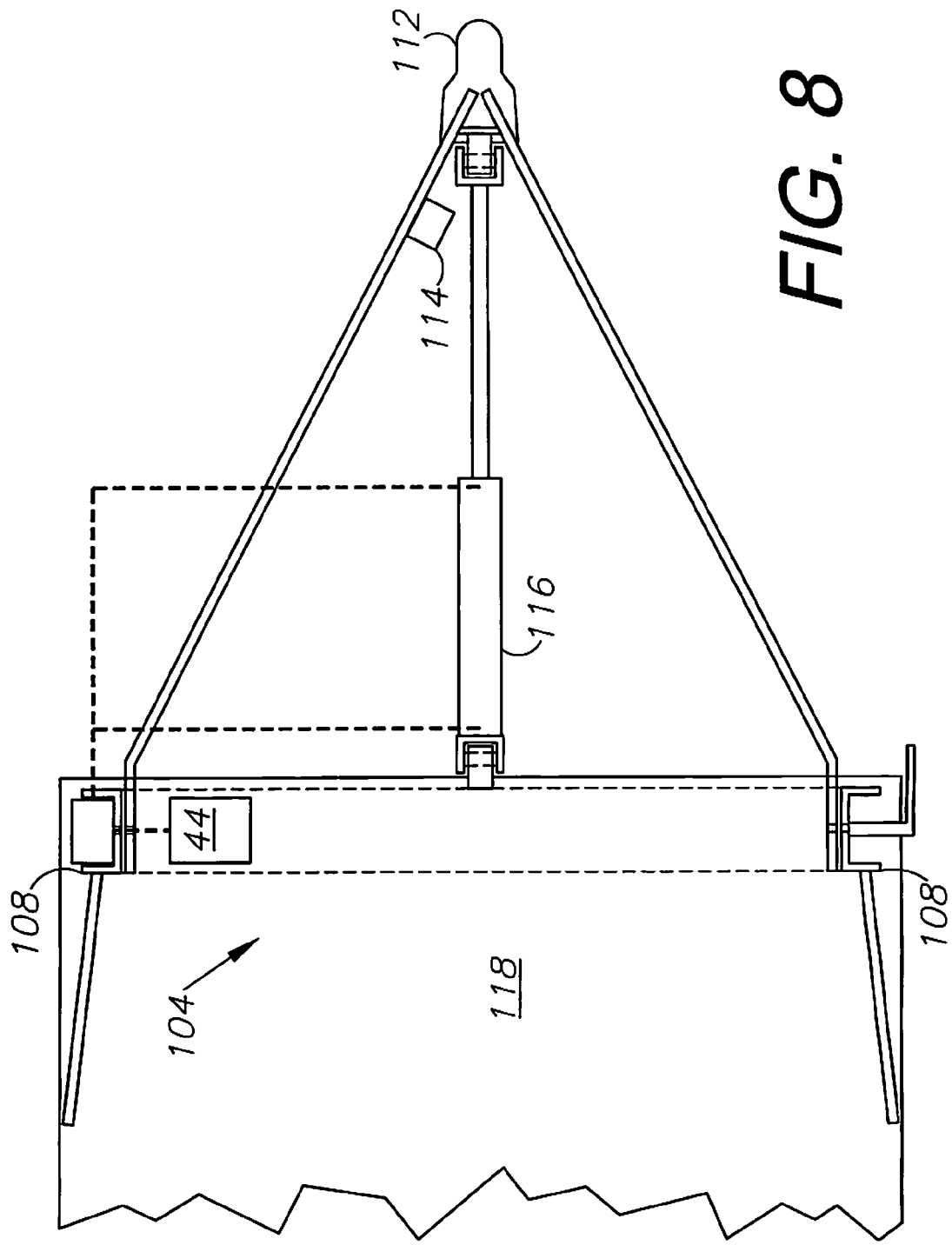

TRAILER WITH HYDRAULIC BED TILT CONTROL

CROSS-REFERENCE TO RELATED APPLICATIONS

This application claims the benefit of U.S. provisional application No. 61/076,115 filed Jun. 26, 2008.

BACKGROUND OF THE INVENTION

1. Field of the Invention

The present invention relates generally to trailers, and in particular to a trailer with a tilting bed and a hydraulic tilt control.

2. Description of the Related Art

Various types of trailers have previously been designed for accommodating a wide variety of cargo. Flatbed trailers are particularly useful for transporting equipment, which can be loaded and unloaded by driving, pulling or pushing it on and off the trailer bed. Such loading and unloading procedures can be facilitated by mounting loading ramps at the trailer back ends. Alternatively, the trailer bed can be pivotally mounted on wheel trucks for movement between transport and tilt (loading/unloading) modes.

Design criteria for equipment-hauling flatbed trailers include ease of reconfiguring for loading/unloading procedures, minimizing slope angles of the beds, accommodating relatively heavy equipment, securely locking in transport and tilt (loading/unloading) modes, deliberately restrained tilting movements and accommodating fifth wheel and bumper hitch tow vehicle attachments.

Previously there has not been available an equipment-hauling trailer with tilt control with the advantages and features of the present invention.

SUMMARY OF THE INVENTION

In the practice of an aspect of the present invention, a trailer is provided for transporting equipment, such as other vehicles, which can be loaded and unloaded by tilting the bed from horizontal. A hydraulic tilt control cushions and restrains movements between tilt and transport configurations and enables operators to control such movements. In a tilt mode, the bed has a relatively low tilt angle due to a pin-in-slot arrangement for mounting the bed on a wheel truck.

BRIEF DESCRIPTION OF THE DRAWINGS

FIG. 6 is a side elevational view of a trailer embodying another aspect of the invention with a bumper hitch, shown in a transport mode.

FIG. 7 is a side elevational view thereof, shown in a tilt mode.

FIG. 8 is a top plan view thereof.

DETAILED DESCRIPTION OF THE PREFERRED EMBODIMENTS

I. Introduction and Environment

Figure 1:
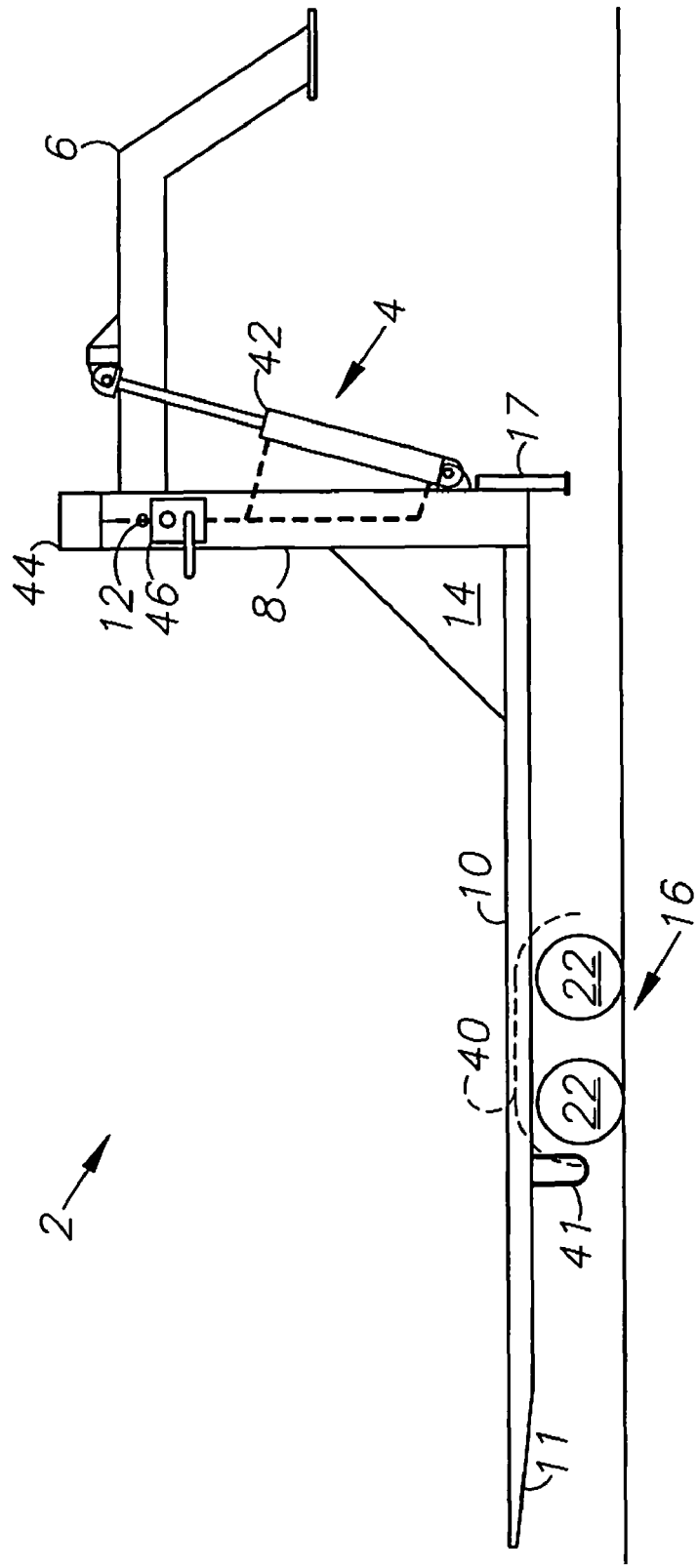
FIG. 1 is a side elevational view of a gooseneck trailer with a tilting bed comprising an aspect of the present invention, shown in a transport mode.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to, with the front being in the direction of travel. The words "inwardly" and "outwardly" refer to directions toward and away from, respectively, the geometric center of the embodiment being described and designated parts thereof. Said terminology will include the words specifically mentioned, derivatives thereof and words of similar meaning. The invention can be fabricated in various sizes and configurations from a wide variety of suitable materials, which are chosen for their characteristics according to the intended use and the operation of the invention.

II. Trailer with Hydraulic Bed Tilt Control

Referring to the drawings in more detail, the reference numeral 2 generally designates a trailer (FIGS. 1 and 2) with a hydraulic bed tilt control 4 (FIGS. 3 and 4) embodying an aspect of the present invention. Without limitation on the generality of useful applications of the present invention, it could be utilized on other types of vehicles and with a variety of beds and tilting and folding mechanisms.

Figure 2:
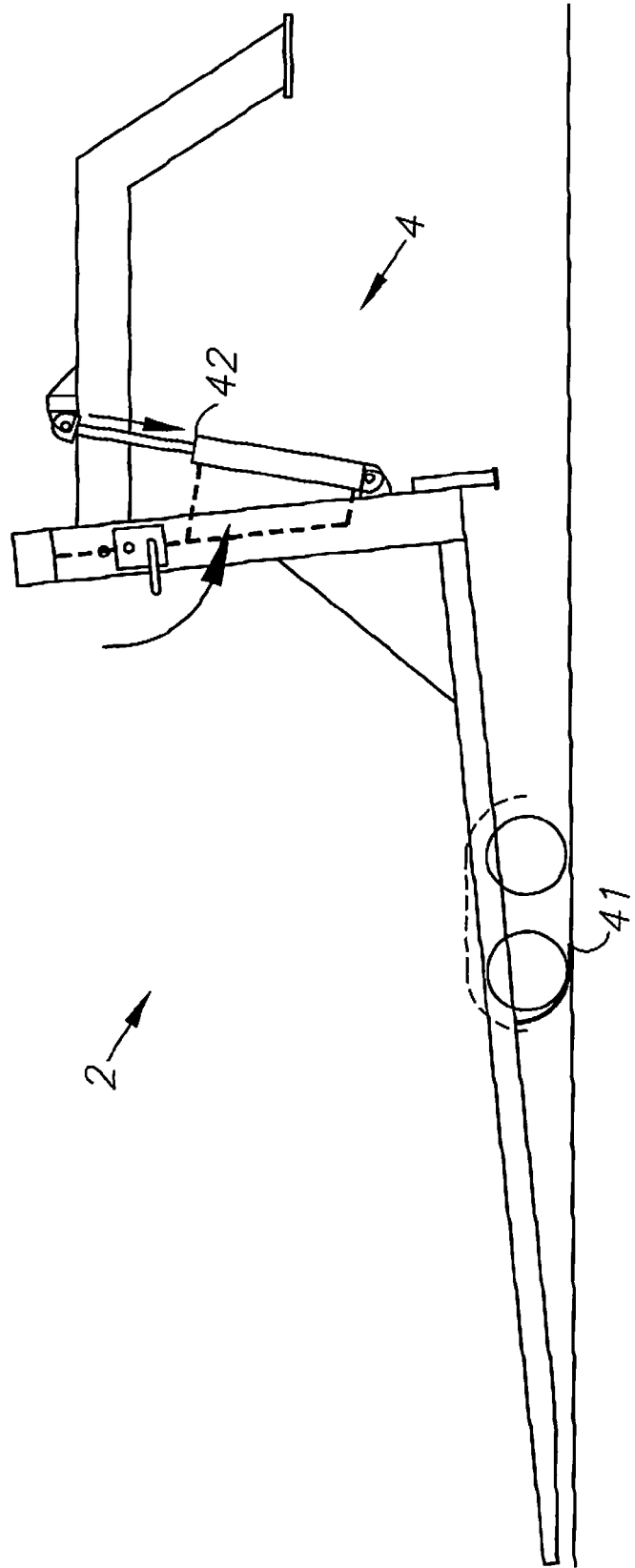
FIG. 2 is another side elevational view thereof, with the tilting bed shown in a loading/unloading (tilt) mode.

As shown in FIGS. 1 and 2, the trailer 2 includes a gooseneck 6 for a "fifth wheel" type mounting on a tow vehicle, such as a truck mounting a fifth wheel attachment in its bed. A pair of uprights 8 are located generally between the gooseneck 6 and a bed 10. The uprights 8 are pivotally connected to the gooseneck 6 by pivot connections 12. A pair of gussets 14 rigidly connects the uprights 8 and the bed 10. The bed 10 mounts a wheel truck 16, which can comprise two or more wheels 22 mounted in tandem on each side. Single-axle trailers could also utilize the hydraulic tilt control 4 of the present invention.

Figure 5:
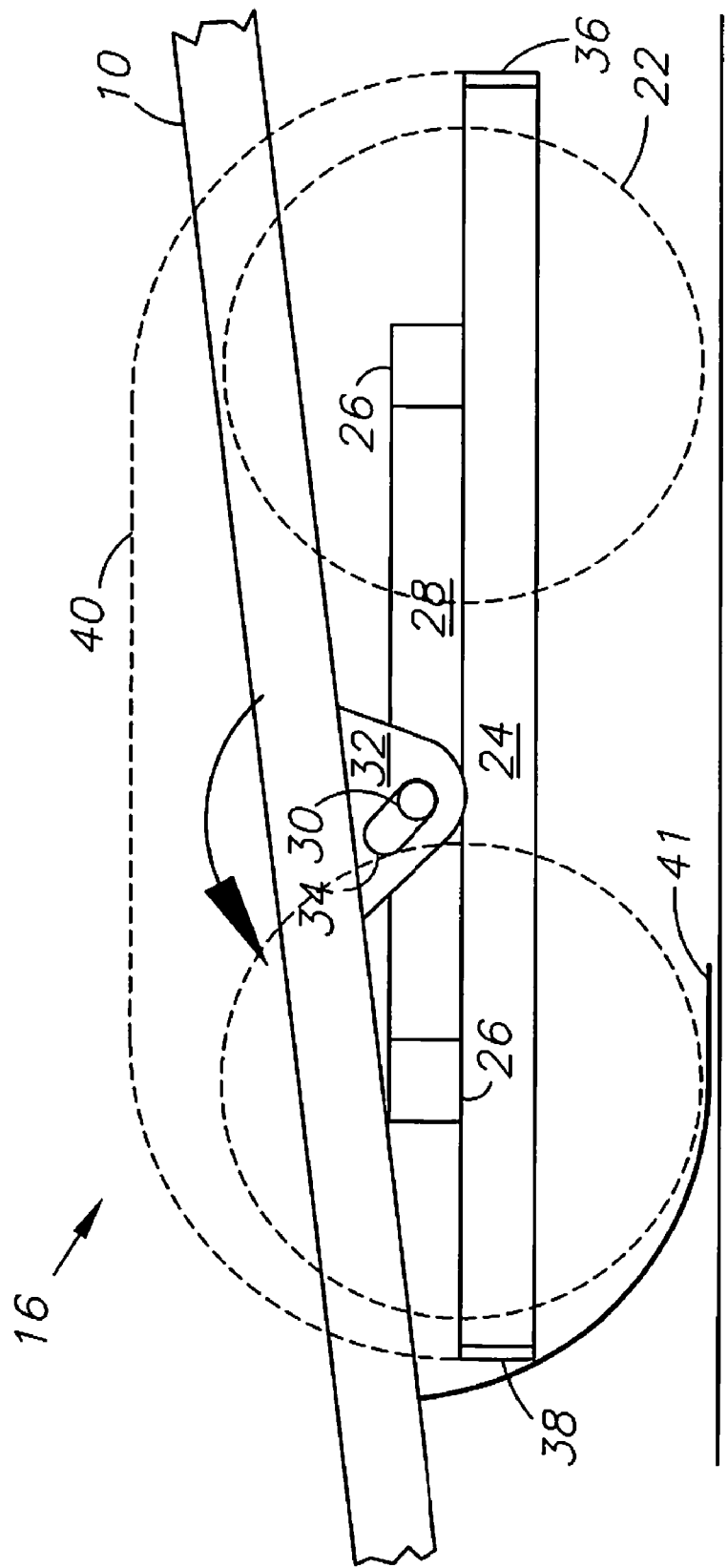
FIG. 5 is an enlarged, fragmentary detail thereof showing a pin-in-slot mounting of the bed on a wheel truck.

As shown in FIG. 5, the double-axle wheel truck 16 includes a pair of supports 24 mounting a pair of axles 26. The axles 26 can comprise torsion axle assemblies, such as those available from Dexter Axle of Elkhart, Ind. A support block 28 is mounted on top of each support 24 and mounts a cross shaft 30, which defines a transverse pivotal axis for the bed 10. The bed 10 is mounted on the cross shaft 30 by brackets 32, which have slots 34 pivotally and slidably receiving the cross shaft 30. The supports 24 include front and rear extensions 36, 38, which mount fenders 40. A flexible wheel restraint 41 is mounted on the bed 10 and can comprise belting, chains, etc. for placement under the wheels 22 to resist rotation and lock the trailer 2 against backward movement. Jacks 17 are mounted on the uprights 8.

Figure 3:
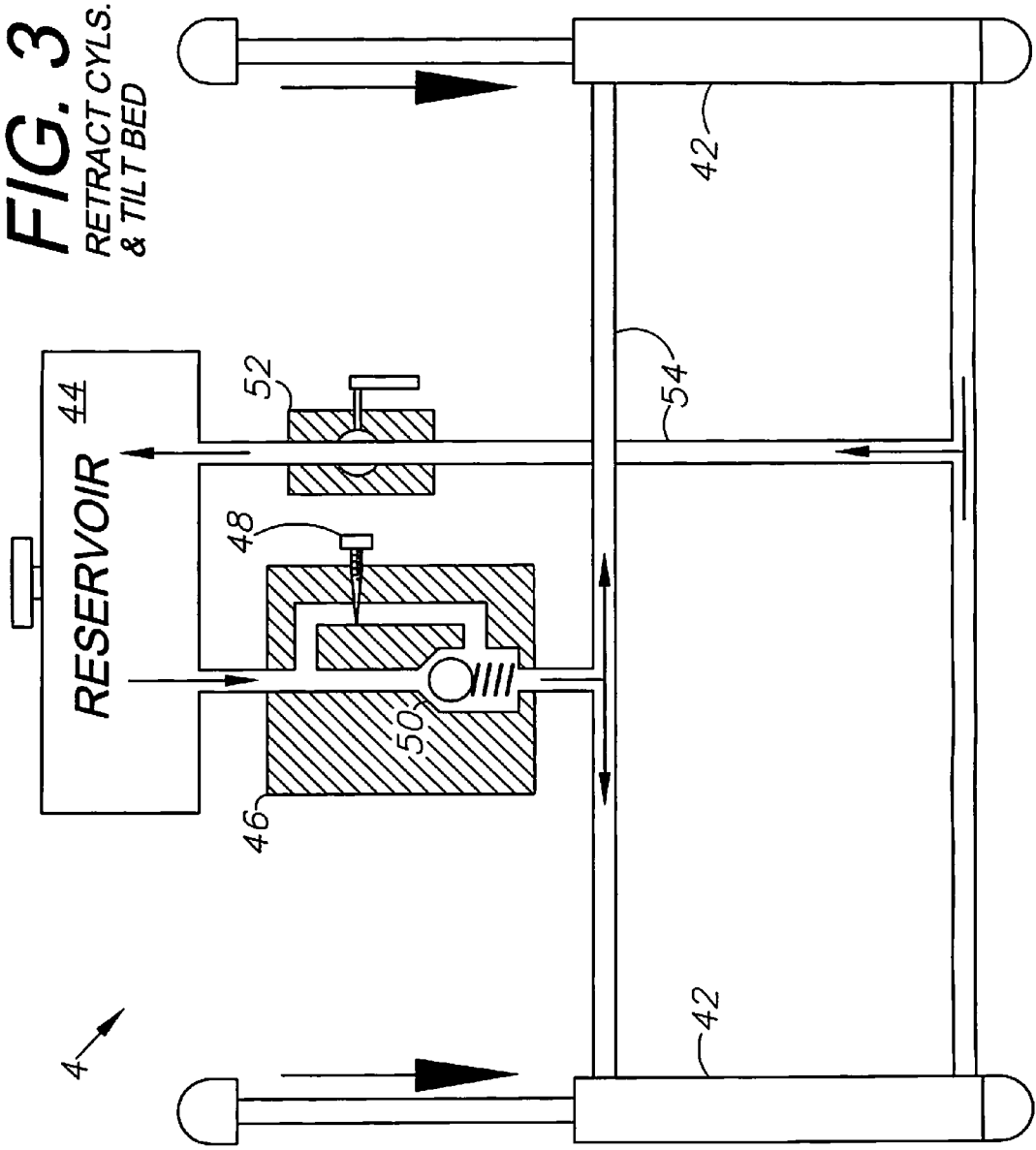
FIG. 3 is an enlarged, fragmentary view thereof showing the hydraulic system during transition to the tilt mode.
Figure 4:
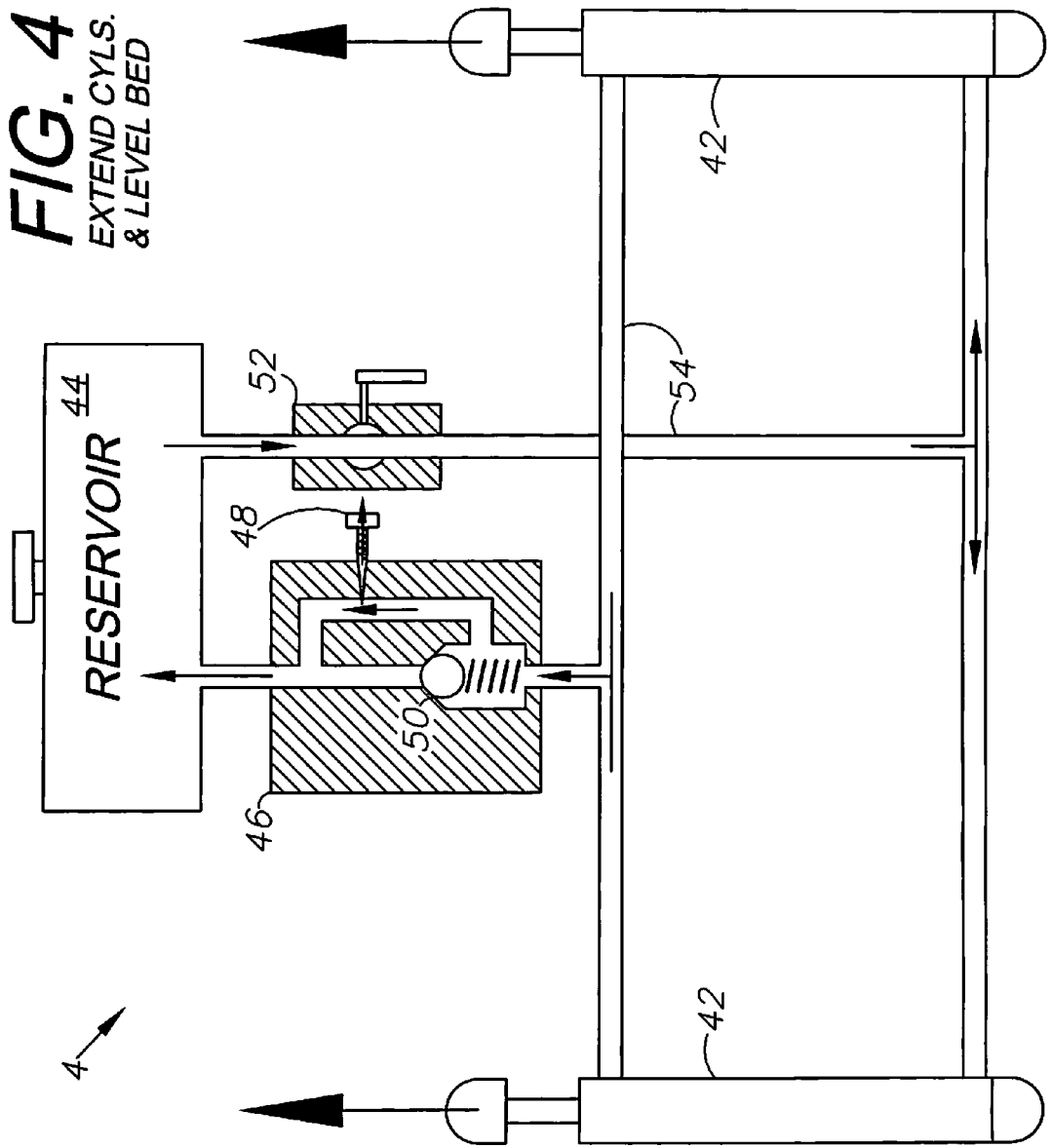
FIG. 4 is an enlarged, fragmentary view thereof showing the hydraulic system during transition to the transport mode.

As shown in FIGS. 3 and 4, the tilt control 4 includes a pair of piston-and-cylinder (PC) units 42 each connected to the gooseneck 6 and a respective upright 8 for restraining (i.e. "cushioning") the limited rotational movement therebetween associated with tilting and leveling the bed 10. An hydraulic fluid reservoir 44 can be mounted on or between the uprights 8 and is connected to a control valve 46 with a parallel needle valve 48 and a spring-loaded check valve 50. A ball valve 52 is also connected to the reservoir 44. The valves 46, 52 can be mounted on a respective upright 8 for easy access by an operator. Suitable hydraulic lines 54 connect the components of the tilt control 4.

III. Operation

FIG. 1 shows the trailer 2 in a transport mode with the bed 10 generally level. FIG. 3 shows the tilt control 4 configuration for transitioning to a tilt mode (FIG. 2). The needle valve 48 is closed and the ball valve 52 is open whereby replacement fluid can flow from the reservoir 44 through the check valve 50 to the upper (piston) ends of the PC units 42 as they retract, simultaneously forcing fluid from the PC unit 42 lower ends, through the open ball valve 52 and into the reservoir 44. The tilting action can be initiated by setting the brakes on the trailer 2 and/or by engaging the wheel restraints 41, and backing the tow vehicle. The proper tilt is achieved when a tail 11 of the bed 10 rests on the ground or pavement surface, which facilitates loading and unloading equipment. The linkage between the bed 10 and the wheel truck 16 functions to maintain a relatively shallow angle of the tilted bed 10, which further facilitates equipment loading and unloading. More specifically, the bed 10 pivots on the cross shaft 30 and slides rearward guided by the bracket slots 34. When the bed 10 comes in contact with the rear axle 26, the slots 34 allows the bed 10 to continue to tilt rearward until the tail 11 rests on the ground (FIG. 5). By mounting the fenders 40 on the support extensions 36, 38 (instead of on the bed 10), they can be maintained relatively low with the bed 10 tilted. This configuration can facilitate opening doors on the equipment located on the bed 10 over the tops of the fenders 40.

The transition to transport mode is shown in FIG. 4 whereby the PC units 42 extend and the bed 10 levels. The needle valve 48 is opened (generally by turning counterclockwise), allowing fluid to gradually escape the PC unit upper (piston) ends and into the reservoir 44. The weight of equipment on the bed 10 biases the trailer 4 towards its transport mode. Also, the tow vehicle can be pulled forward. Simultaneously, replacement fluid flows through the open ball valve 52 and into the PC unit 42 lower ends. Relatively fine control of the tilt-to-level movement is achievable with the needle valve 48. For example, by opening it relatively slowly the bed 10 rotation is restrained or "cushioned" for the safety of the operator and to prevent impact-type damage to the trailer 2 and the equipment. The ball valve 52 functions primarily as a lock against hydraulic fluid movement whereby the PC units 42 are effectively restrained. The ball valve 52 would normally be closed during transit. A mechanical safety lock can be provided for locking the trailer 2 in its transport mode.

IV. Alternative Aspect Bumper Hitch Trailer 102

A trailer 102 with a tilt control 104 comprising an alternative aspect of the present invention is shown in FIGS. 6-8 and includes a similar hydraulic configuration to the tilt control 4. Operation is also substantially similar whereby the trailer 12 converts from a transport mode (FIG. 6) to a tilt mode (FIG. 7). A mechanical lock 106 is provided for locking uprights 108 against rotation relative to braces 110, which extend to a hitch 112, which mounts a jack 114. A single PC unit 116 extends from the front of a bed 118 to the hitch 112 and cushions or restrains a folding action of the uprights 108 relative to the braces 110 associated with transitioning between transport and tilt modes.

It is to be understood that the invention can be embodied in various forms, and is not to be limited to the examples discussed above. Other components and configurations can be utilized in the practice of the present invention.

Having thus described the disclosed subject matter, what is claimed as new and desired to be secured by Letters Patent is:

1. A trailer with a tilting bed, comprising:
   a bed having a front end and a rear end, said rear end having an angled tail;
   a pair of brackets mounted below said bed and each having an elongated slot therethrough;
   a pair of uprights having an upper and lower end, said lower end fixedly secured to said bed front end by a gusset;
   a gooseneck extending forward of said bed being pivotally attached to said upright upper end at a pivot connection;
   a pair of piston-and-cylinder (PC) units including a back end pivotally connected to said upright lower end and a front end pivotally connected to said gooseneck, said pair of piston-and-cylinder (PC) units units movable between a retracted position and an extended position;
   a wheel assembly disposed below said bed having a pair longitudinal supports mounting at least one transverse axle, said axle rotatably mounting a pair of wheels, said supports mounting a longitudinal support block, said support block mounting a transverse cross shaft, said cross shaft pivotally and slidably received within said slots of said brackets for pivoting and sliding said bed thereon between a horizontal transport configuration and a tilted front-to-rear downward sloping configuration;
   said supports having a front and a rear extension, said extensions mounting a fender;
   said bed having a wheel restraint resisting backward movement of said trailer by engaging said wheels;
   a hydraulic fluid reservoir mounted on said trailer fluidly connected to a control valve and a shut-off valve, said shut-off valve movable between an open and closed position and fluidly connected to an end of each one of said pair of piston-and-cylinder (PC) units by a hydraulic line, said control valve connected to an opposite end of each one of said pair of piston-and-cylinder (PC) units by a hydraulic line;
   said control valve having a spring-loaded check valve and a parallel needle valve threadably movable between an open and a closed position;
   said needle valve adjustably controlling flow of fluid and rate of change of said bed from said tilted configuration to said horizontal transport configuration;
   said bed movable from said tilted configuration to said horizontal transport configuration when said shut-off valve is in said open position, said needle valve is in said open position, and said pair of piston-and-cylinder (PC) units are movable from said retracted position to said extended position;
   said bed movable from said horizontal transport configuration to said tilted configuration when said shut-off valve is in said open position and said needle valve is in said closed position, and said pair of piston-and-cylinder (PC) units are movable from said extended position to said retracted position; and
   said pair of piston-and-cylinder (PC) units movement arrested when said ball valve is in said closed position.

2. A trailer with a tilting bed of claim 1, wherein:
   said axle comprises a torsion axle assembly.

3. A trailer with a tilting bed of claim 1, wherein:
said wheel assembly mounts a pair of axles, said axles each rotatably mounting a pair of wheels.

4. A trailer with a tilting bed of claim 3, wherein:
said pair of axles each comprise a torsion axle assembly.

5. A trailer with a tilting bed of claim 1, wherein:
said wheel restraint is located rearward of said wheel assembly and depending from said bed.

6. A trailer with a tilting bed of claim 5, wherein:
said wheel restraint comprises belting.

7. A trailer with a tilting bed of claim 5, wherein:
said wheel restraint comprises chains.

8. A trailer with a tilting bed of claim 1, wherein:
said shut-off valve comprises a ball valve.

9. A trailer with a tilting bed, comprising:
a bed having a front end and a rear end, said rear end having an angled tail, said front end having a pair of jacks depending therefrom;
a pair of brackets mounted below said bed and each having an elongated slot therethrough;
a pair of uprights having an upper and lower end, said lower end fixedly secured to said bed front end by a gusset;
a gooseneck extending forward of said bed being pivotally attached to said upright upper end at a pivot connection;
a pair of piston-and-cylinder (PC) units including a back end pivotally connected to said upright lower end and a front end pivotally connected to said gooseneck, said pair of piston-and-cylinder (PC) units movable between a retracted position and an extended position;
a wheel assembly disposed below said bed having a pair longitudinal supports mounting a pair of transverse torsion axles, said axles each rotatably mounting a pair of wheels, said supports mounting a longitudinal support block, said support block mounting a transverse cross shaft, said cross shaft pivotally and slidably received within said slots of said brackets for pivoting and sliding said bed thereon between a horizontal transport configuration and a tilted front-to-rear downward sloping configuration;
said supports having a front and a rear extension, said extensions mounting a fender;
said bed having a wheel restraint resisting backward movement of said trailer by engaging said wheels;
said wheel restraint selected from the group consisting of belting and chains;
a hydraulic fluid reservoir mounted on said trailer fluidly connected to a control valve and a ball valve, said ball valve movable between an open and closed position and fluidly connected to an end of each one of said pair of piston-and-cylinder (PC) units by a hydraulic line, said control valve connected to an opposite end of each one of said pair of piston-and-cylinder (PC) units by a hydraulic line
said control valve having a spring-loaded check valve and a parallel needle valve threadably movable between an open and a closed position;
said needle valve adjustably controlling flow of fluid and rate of change of said bed from said tilted configuration to said horizontal transport configuration;
said bed movable from said tilted configuration to said horizontal transport configuration when said ball valve is in said open position, said needle valve is in said open position, and said pair of piston-and-cylinder (PC) units are movable from said retracted position to said extended position;
said bed movable from said horizontal transport configuration to said tilted configuration when said ball valve is in said open position and said needle valve is in said closed position, and said pair of piston-and-cylinder (PC) units are movable from said extended position to said retracted position; and
said pair of piston-and-cylinder (PC) units movement is arrested when said ball valve is in said closed position.

10. A trailer with a tilting bed, comprising:
a bed having a front and a rear end, said bed movable between a horizontal transport configuration and a tilted front-to-rear downward sloping configuration;
a pair of brackets mounted below said bed and each having an elongated slot therethrough;
a pair of uprights having an upper and lower end, said upper end having a mechanical lock, said lower end fixedly secured to said bed front end buy a gusset;
a pair of braces having a front end and a rear end, said rear end pivotally attached to said upright upper end at a pivot connection and selectively engaging with said mechanical lock, said braces extending forward and downward from said rear end towards said front end;
a hitch having a front end and a rear end, said hitch fixedly secured to said braces front end, said hitch mounting a jack depending therefrom;
a piston-and-cylinder (PC) unit including a back end pivotally connected to said bed front end and a front end pivotally connected to said hitch rear end, said piston-and-cylinder (PC) unit movable between a retracted position and an extended position;
a wheel assembly disposed below said bed having a pair longitudinal supports mounting at lease one transverse torsion axle, said axle rotatably mounting a pair of wheels, said supports mounting a longitudinal support block, said support block mounting a transverse cross shaft, said cross shaft pivotally and slidably received within said slots of said brackets for pivoting and sliding said bed thereon between a horizontal transport configuration and a tilted front-to-rear downward sloping configuration;
said supports having a front and rear extension, said extensions mounting a fender;
said bed having a wheel restraint resisting backward movement of said trailer by engaging said wheels;
a hydraulic fluid reservoir mounted on said trailer fluidly connected to a control valve and a shut-off valve, said shut-off valve movable between an open and closed position and fluidly connected to an end of said piston-and-cylinder (PC) unit by a hydraulic line, said control valve connected to an opposite end of said piston-and-cylinder (PC) unit by a hydraulic line
said control valve having a spring-loaded check valve and a parallel needle valve threadably movable between an open and closed position;
said needle valve adjustably controlling flow of fluid and rate of change of said bed from said tilted configuration to said horizontal transport configuration;
said bed movable from said tilted configuration to said horizontal transport configuration when said shut-off valve is in said open position and said needle valve is in said open position, and said piston-and-cylinder (PC) unit is movable from said retracted position to said extended position;
said bed movable from said horizontal transport configuration to said tilted configuration when said shut-off valve is in said open position and said needle valve is in said closed position, and said piston-and-cylinder (PC) unit is movable from said extended position to said retracted position; and said piston-and-cylinder (PC) unit movement is arrested when said ball valve is in said closed position.

11. A trailer with a tilting bed of claim 10, wherein: said axle comprises a torsion axle assembly.

12. A trailer with a tilting bed of claim 10, wherein: said wheel assembly mounts a pair of axles, said axles each rotatably mounting a pair of wheels.

13. A trailer with a tilting bed of claim 12, wherein: said pair of axles each comprise a torsion axle assembly.

14. A trailer with a tilting bed of claim 10, wherein: said wheel restraint is located rearward of said wheel assembly and depending from said bed.

15. A trailer with a tilting bed of claim 14, wherein: said wheel restraint comprises belting.

16. A trailer with a tilting bed of claim 14, wherein: said wheel restraint comprises chains.

17. A trailer with a tilting bed of claim 10, wherein: said shut-off valve comprises a ball valve.

* * * * *